United States Patent [19]

Karn

[11] 4,197,206
[45] Apr. 8, 1980

[54] HEAT SEALABLE ION PERMEABLE MEMBRANES

[76] Inventor: William S. Karn, 518 Dickson Ave., Ben Avon, Pa. 15202

[21] Appl. No.: 941,966

[22] Filed: Sep. 13, 1978

[51] Int. Cl.² ............................................. B10D 31/00
[52] U.S. Cl. .............................. 210/321 A; 210/323 R; 210/461; 204/253
[58] Field of Search .................. 264/285, 339; 210/321 A, 321 B, 321 R, 460, 461, 462, 252, 335, 340, 323 R, 500 M; 55/158; 422/48; 156/182, 253, 290; 204/253, 257, 296, 252, 180 P

[56] References Cited

U.S. PATENT DOCUMENTS

| 839,815 | 1/1907 | Decker | 204/296 |
|---|---|---|---|
| 2,741,591 | 4/1956 | Dewey et al. | 204/180 |
| 2,867,575 | 1/1959 | De Jong | 204/296 |
| 3,342,719 | 9/1967 | Chen et al. | 204/301 |
| 3,388,080 | 6/1968 | Korosy | 204/296 |
| 3,614,856 | 10/1971 | Sanz et al. | 55/16 |
| 3,616,927 | 11/1971 | Muir | 210/321 B |
| 3,911,080 | 10/1975 | Mehl et al. | 423/10 |
| 4,057,481 | 11/1977 | Lee et al. | 204/296 |
| 4,111,659 | 9/1978 | Bowley | 422/48 |

OTHER PUBLICATIONS

Crescenzi et al, "Development of a Simplified Membrane Oxygenator" Trans. Am. Soc. Art. Internal Organs, vol. 5, 1959, p. 148.

Primary Examiner—Charles N. Hart
Assistant Examiner—David R. Sadowski

[57] ABSTRACT

An ion selective semipermeable membrane such as is used in electrodialysis cell assemblies is fabricated with an unreacted border region of a polymer film which is heat sealable to itself and to other materials of similar composition. Within the border region are sealed two flow port connections to pass ionic process liquid across the face of the membrane. The border regions of one membrane are heat seal bonded at the edge to the border regions of a subsequent membrane in a sequence to form an electrodialysis cell assembly accordion bellows like in configuration. The flow ports communicate with the compartments so formed. Membranes produced by chlorosulfonation of polyethylene are especially suitable for heat sealing.

4 Claims, 5 Drawing Figures

HEAT SEALABLE ION PERMEABLE MEMBRANES

SUMMARY OF THE INVENTION

An object of this invention is to provide a cheap, good quality means for forming leak tight joints in assemblying ion selective semipermeable membranes into an electrolytic cell configuration.

Another object of this invention is to utilize low cost ion selective membranes produced from chlorosulfonated polyolefin film with correspondingly low cost assembly means.

Another object of this invention is to form ion permeable membranes from chlorosulfonated polyolefin film while retaining an unreacted heat seal bondable region bordering the membrane region.

Another object of this invention is to join conveniently flow ports to ion permeable membrane compartments in a cell stack.

These and other objects may be understood by detailed description of the invention which follows.

BRIEF DESCRIPTION OF THE DRAWING

The figures of the drawing show membrane production means and membrane assembly configurations.

DETAILED DESCRIPTION OF THE INVENTION

In the prior art electrodialysis membranes have been assembled with appropriate spacers and flow passage means for formation of electrodialysis cell assemblies. The assemblies have been held together principally by clamping means such as threaded tie bolts. Occasionally cementing material has been added to the joints between membranes and spacers to secure a leak tight seal. It is not easy to arrest all internal and external leakage in a design using only clamping force to seal.

Prior work by others offers availability of low cost membranes of polyolefins (U.S. Pat. Nos. 3,388,080 and 4,057,481 and paper by Jagur-Grodzinski et al. in 4th International Symposium on Fresh Water from The Sea, volume 4, 171–180, 1973 "Ionically Charged Tubular Membranes for Water Softening and Desalination"). In the present invention these membrane production techniques are used with only one essential addition modifying the membrane composite geometry. For the purpose of this invention the polymer film being processed is clamped or masked off or otherwise isolated in the margin boundary region to prevent chemical reaction in this region. Subsequent steps after chlorosulfonation such as hydrolysis of the chlorosulfonate sites to cationic sites or amination of the chlorine sites to anionic sites leave the boundary region as unmodified heat fusion bondable polymer film.

Figure 2:
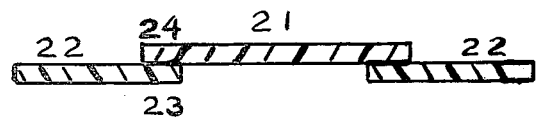
FIG. 2 illustrates taking a solvent cast chlorosulfonated polyethylene film and joining it to a border region of unchanged polyethylene film.

The paper by Grodzinski describes an alternate method of membrane fabrication, viz. casting a film from a solution of chlorosulfonated polyethylene in chlorobenzene. Using a cast film (FIG. 2 piece 21) in the present invention requires bonding the cast film edge (FIG. 2 piece region 24) to a margin boundary region film (piece 22). That bonding can be done by treating a seal line within said margin boundary region film (piece region 23) with chlorosulfonation reagents described in U.S. Pat. No. 3,388,080. Along this seal line (23) the cast film (21) may join by casting in place or by solvent cementing or by heat bonding (line region 24 joining to 23). Varieties of polymer film systems are described in U.S. Pat. No. 4,057,481, the total pertinent art including polymers, copolymers, graft polymers, and matrix held polymers. These polymer systems are appropriate in varying degrees for practice of this invention.

A single detailed example will be given. This is essentially a copy of Example 3 of U.S. Pat. No. 3,388,080 to which example clamping or masking means are added to preserve an unreacted margin boundary region of polyethylene.

EXAMPLE 1

Figure 1:
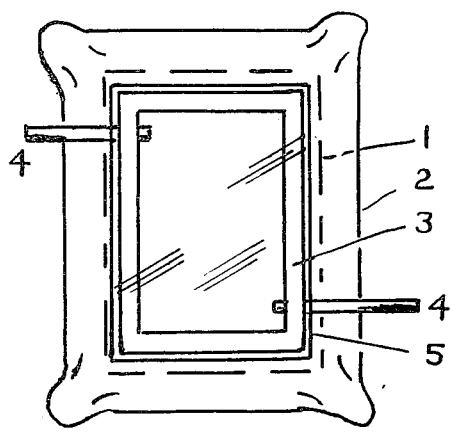
FIG. 1 is an arrangement for chlorosulfonating the central region of a sheet of polyolefin film while leaving a border region unchanged.

A film of polyethylene of 0.01 cm thickness is placed upon a glass plate. (FIG. 1 shows glass plate 1 draped with film piece 2.) The film is of sufficient area to extend beyond the glass plate on all sides. Within the glass plate region over the film is placed a shallow box (piece 3) which is without bottom, having sides describing a picture frame shape or annular shape. The box completely surrounds the central region of the polyethylene film. Thru the side of the box are placed entrance and exit tubes (part 4) for passing the reactive gases. To the top of the box is fitted a glass window (piece 5). The film is reacted during two hours with a gaseous mixture of sulfur dioxide and chlorine, which is passed thru carbon tetrachloride. The reaction is carried out under irradiation by direct sunlight for two hours. The thus obtained chlorosulfonated product is subjected to hydrolysis during 1 hour in 5% (weight/volume) solution of sodium hydroxide in a water bath. A film having electrical resistance in the central membrane region of 5 ohms/sq.cm. in N/10 NaCl solution is obtained. The capacity of the material is 0.9 meq/g. The permselectivity of the membrane is 87% toward K plus ions in a N/10 KCl solution.

Figure 3:
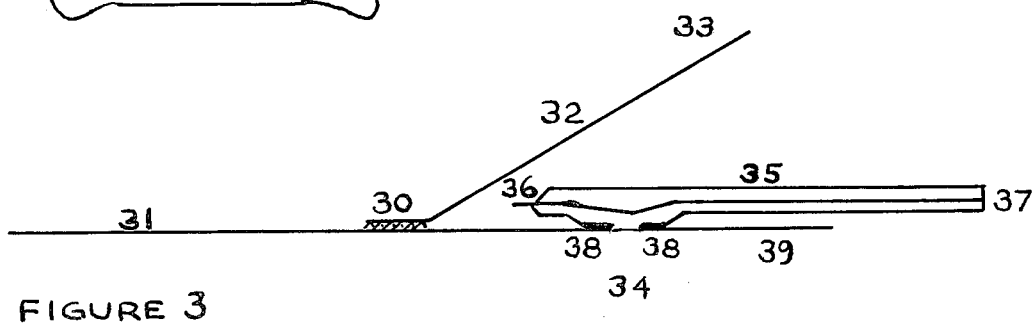
FIG. 3 illustrates the addition of a bi-leaf border to a composite film membrane produced as in FIG. 1 and also illustrates addition of a flow port connection to the integral margin frame boundary region.

The product of the above example is an ion permeable membrane composite having an integral margin frame boundary region completely bordering the ion permeable region of said membrane composite and said boundary region is a polymer film capable of heat seal fusion bonding to itself and to other materials of similar composition. Attractive qualities of the above composite film membrane are that the boundary region can receive fusion heat sealed flow ports (FIG. 3 piece 37) and that the entire unit can be heat seal bonded to adjacent (seal line along piece 32, 42, 52 at piece region 33, 43, 53) compartments leak free and flexible in alignment and positioning. This is an economical means for assembly and makes for a permanent reliable seal.

Such an assembly is an assembly of ion permeable membrane composites, each of said composites having an integral margin frame boundary region completely bordering the ion permeable region of said membrane composite and having flow port connectors giving fluid access to faces of said membranes, said flow port connectors being joined to and passing thru said boundary region, said boundary region of one membrane composite being joined to a boundary region of a second membrane composite and the second joined to the next in a successive series of boundary regions so as to form a series of sealed membrane cell compartments fed by said flow port connectors wherein the improvement over prior art comprises that said boundary region is a polymer film capable of heat seal fusion bonding to itself and to other materials of similar composition, said heat seal feature being used to effect said joining of flow port connectors and to effect said joining of boundary region of each membrane composite to the boundary region of an adjacent membrane composite.

The process described in example 1 above is a process of producing a composite composition of matter comprising an ion permeable membrane having a complete integral boundary region that is heat bondable to itself and to similar materials wherein the improvement over prior art comprises that said composite composition of matter is made from a uniform polymer system film, which as in example 1 is caused to acquire a central region of ion permeable quality while excluding the boundary region from conversion to ion permeable quality.

Before or after the chemical reaction step of example 1 there may be inserted the flow port connections (piece 37 of FIG. 3) of the final cell assembly. One easily made configuration (shown in FIG. 3) is to lap bond (region 38 of piece 35) an end region of a length (35) of lay-flat polyethylene tubular film to the margin region frame (39) that is not to undergo chemical reaction. In the lap sealed area (38) a flow hole (34) is made thru the two film layers. The adjacent end (36) of the tubular lay-flat film is sealed off.

This configuration including flow port connection as just described is an ion permeable membrane composite having an integral margin frame boundary region bordering the ion permeable region of said membrane composite, having flow port connector giving access of fluid to face of said membrane, said flow port connector being joined to and passing thru said boundary region, said boundary region being a polymer film capable of heat seal fusion bonding to itself and to other materials of similar composition wherein the improvement over prior art comprises that said flow port connector is a tubular film closed at one end and lap-bonded near the closed end to a surface of said boundary region polymer film, a flow hole being made thru the two fusion lap-bonded film layers and the flow hole lying within the are bounded by the fusion line so as to allow liquid passing thru said flow port connector to reach the face of said ion permeable membrane region.

Figure 4:
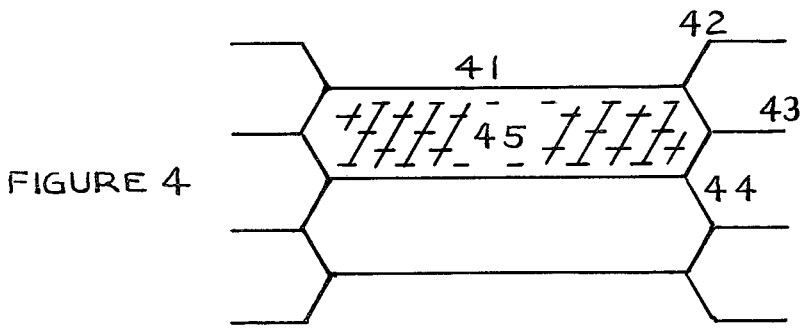
FIG. 4 illustrates using the bi-leaf membrane composite in a series of heat sealed membranes in the manner of an accordion bellows.
Figure 5:
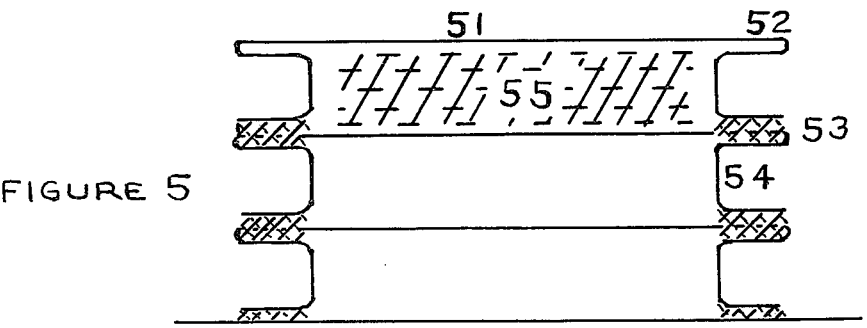
FIG. 5 illustrates a means of assemblying the membrane composite with only a single leaf border region.

Another convenient step is to add a second picture frame shaped polyolefin film margin region (piece 32 and 42) the heat seal line (piece region 30) joining the second leaf to the first leaf (32 to 39 bonded at 30) being along the inside edge of the picture frame shaped film where it lies against the corresponding surface of the unreacted polyolefin film margin region next to the membrane region (region 30). These bi-leaf edges (edges 33 and 39) are a convenience in subsequent stacking and heat sealing the membrane assemblies (FIG. 4), but the bi-leaf feature is not absolutely essential (FIG. 5).

The double edge arrangement just described is a membrane composite wherein the boundary region is bi-leaf or twofold in number at the periphery of said membrane composite and becoming a single leaf boundary region toward the ion permeable region.

In the finished cell stack assembly it is necessary to have some sort of spacer between membrane layers to prevent their clinging to one another with attendant excess current in that region. To serve as spacer a patch of bulky synthetic fiber cloth (piece 45, 55) can be inserted between membranes during assembling.

A method of seal assembling a plurality of ion permeable membranes into a dialysis system will now be described. With the bi-leaf edge feature, (piece regions 32,39,42,44) one proceeds with the assembling by heat seal joining one bi-leaf edge to the next one (edge 33 to next layer edge 39) in sequence to produce an accordion bellows like array (42,43,44). The alternate bi-leaf borders or margins (32,39) carry flow ports attached (piece 37).

The assembly immediately above described is an assembly of ion permeable membrane composites, each of said composites having an integral margin frame boundary region completely bordering the ion permeable region of said membrane composite and having flow port connectors giving fluid access to faces of said membranes, said flow port connectors being joined to and passing thru said boundary region, said boundary region of one membrane composite being joined to a boundary region of a second membrane composite and the second joined to the next in a successive series of boundary regions so as to form a series of sealed membrane cell compartments fed by said flow port connectors wherein the improvement over prior art comprises that said boundary region is a polymer film capable of heat seal fusion bonding to itself and to other materials of similar composition, said heat seal feature being used to effect said joining of flow port connectors and to effect said joining of boundary region of each membrane composite to the boundary region of an adjacent membrane composite.

If the bi-leaf edge feature is not employed then the single edge (22, 39, 52) may curve over in S-shaped fashion to meet the base of the next folded over edge for the heat seal line (53). Using a rectangular shaped frame membrane border the straight line joints are of geometric simplicity. The corners involve some wrinkling and lapping or compound distortion to make regions meet. That situation demonstrates the beauty of the heat seal method and the use of film construction. With polyolefin film it is sufficient to gather together the surfaces to be hermetically bonded and the heat seal action will seal thru wrinkles, compound curves, multi-layers and distortion and still give a flexible, tough, liquid tight system. The cell compartments easily adjust in thickness to the thickness of the inserted spacer. An external support frame in the form of a box keeps the entire assembly from billowing out excessively accordion like under internal fluid pressures.

It may be noted that the membrane systems claimed in this invention can also be used in ionic dialysis water softening systems by use of a one polarity membrane array as well as in electrodialysis and in water splitting processes.

I claim:

1. An assembly of ion permeable membrane composites, each of said composites having an integral margin frame boundary region completely bordering the ion permeable region of said membrane composite and having flow port connectors giving fluid access to faces of said membranes, said flow port connectors being joined to and passing thru said boundary region, said boundary region of one membrane composite being joined to the boundary region of a second membrane composite and the second membrane composite joined to the next membrane composite in a successive series of boundary regions so as to form a series of sealed membrane cell compartments fed by said flow port connectors wherein said assembly has a novel aggregate of features which are the apparatus design features that said boundary region is a thermoplastic film material, that said boundary region is heat sealed to said flow port connectors, that said boundary region is heat sealed to said second membrane composite boundary region completely around the periphery of said membrane composites, that successive membranes are so joined so as to make a multiple layer of stacked compartments, and that each of said compartments within said multiple layer of stacked compartments has its ion permeable walls shared in common with its neighboring compartment.

2. The assembly of claim 1 wherein said boundary region thermoplastic film is a polyolefin.

3. An ion permeable membrane composite having an integral margin frame boundary region bordering the ion permeable region of said membrane composite, having flow port connector giving access of fluid to face of said membrane, said flow port connector being joined to and passing thru said boundary region, said boundary region being a polymer film capable of heat seal fusion bonding to itself and to other material of similar composition wherein the improvement comprises that said flow port connector is a tubular film closed at one end and lap-bonded near the closed end to a surface of said boundary region polymer film, a flow hole being made thru the two fusion lap-bonded film layers and made such that the flow hole lies within the area bounded by the fusion line so as to allow liquid passing thru said flow port connector to reach the face of said ion permeable membrane region.

4. An ion permeable membrane composite having an ion permeable region and having an ion impermeable region, said ion permeable membrane composite having two integral margin frame boundary regions of thermoplastic film comprising said ion impermeable region, each of said intergral margin frame boundary regions completely bordering said ion permeable region of said membrane composite with such geometry that said composite, if viewed in any cross section cut perpendicular to the plane of the membrane fully across any portion of said ion permeable region and with a continuing of the cut fully across any portion of said two integral margin frame boundary regions along any cross section plane fully traversing said ion permeable membrane composite, would present a view of a central ion permeable region integrally bounded on each edge individually and jointly by said two thermoplastic film integral margin frame boundary regions.

* * * * *